June 20, 1950    R. V. GRAVEEL    2,512,015
DEVICE FOR PRODUCING SOUND EFFECTS
Filed Oct. 1, 1943
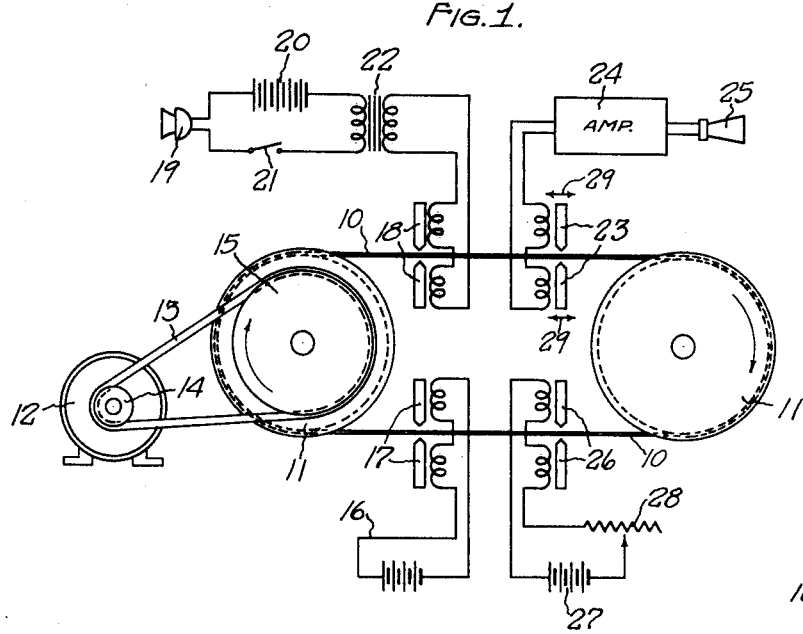
FIG. 1.
FIG. 5.
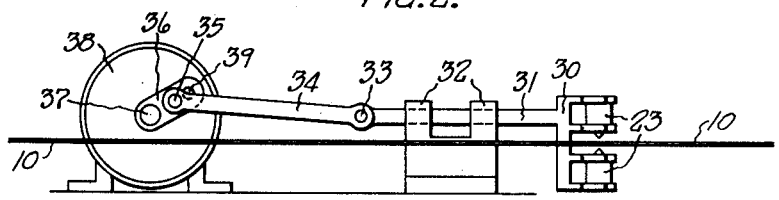
FIG. 2.
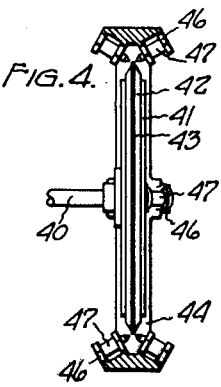
FIG. 4.
FIG. 3.
INVENTOR.
ROY V. GRAVEEL.
BY Oltsch & Knoblock
Attorneys.

Patented June 20, 1950

2,512,015

UNITED STATES PATENT OFFICE 2,512,015

DEVICE FOR PRODUCING SOUND EFFECTS

Roy V. Graveel, Mishawaka, Ind.; Rene J. Graveel, administrator of said Roy V. Graveel, deceased, assignor to James M. Sixsmith Application October 1, 1943, Serial No. 504,539

2 Claims. (Cl. 179—100.2)

This invention relates to a device for producing sound effects.

It is frequently desirable, in the broadcasting, reproducing and transmitting of sound, to produce and include certain sound qualities or properties which are not inherent in the sound naturally. Thus, it may be desired to impart to sound produced by a given source, the characteristics and properties of vibrato or tremolo or both. Also, it may be desired to create a reverberatory effect of controlled or predetermined character which cannot be produced naturally by the available sound producing mediums or in the situs of use thereof. Examples of such uses are the simulation of the sound characteristics of a given musical instrument, such as a pipe organ, by transformation of the sound produced by a different instrument, such as an electric organ; the simulation of bird and animal calls and noises by transformation of vocal sounds; the simulation of the reverberatory effects of a large enclosure within a small enclosure; and the transforming of the sound of one voice to imitate another of different timbre. Also, it may be desired to create these effects under different conditions, such as occur in radio broadcasting, in public address systems, in making recordings, and the like. It is the primary object of this invention to provide means for accomplishing the above enumerated desiderata.

A further object is to provide a device of the magnetic tape recording and reproducing type having recording and reproducing heads, and means for vibrating or oscillating one of said heads lengthwise of said tape to create the property of vibrato.

A further object is to provide a device of the magnetic tape recording and reproducing type wherein said tape is alternately magnetized and partially demagnetized to produce a sound record at magnetized portions thereof having a predominant sound characteristic and a secondary echoing or reverberatory background sound characteristic.

A further object is to provide a sound recording and reproducing device with adjustable means for introducing selected extraneous effects in the reproduced sound as compared to the recorded sound.

Other objects will be apparent from the description, drawing and appended claims.

In the drawing:

Fig. 1 is a diagrammatic illustration of one embodiment of the invention.

Fig. 2 is an enlarged detail view of one portion of the device shown in Fig. 1.

Fig. 3 is a side view of another form of the invention, with parts shown in section.

Fig. 4 is an end view of the Fig. 3 embodiment.

Fig. 5 is a view illustrating means for producing oscillation of a recording head transversely of a recording wire or tape.

I have chosen to illustrate the invention as incorporated in a sound recording and reproducing device of the type using a magnetizable tape or wire 10 as the recording element. In the Fig. 1 embodiment this tape or wire is endless, and is trained around a pair of spaced reels or pulleys 11 rotatable about fixed spaced parallel axes in the same manner that a drive belt is trained around driving and driven pulleys. The pulleys or reels 11 are preferably peripherally grooved to guide the wire, and one therefore is driven by a motor 12 or the like as by means of the V-belt 13 trained around pulleys 14 and 15 on the shafts of the motor and the driving unit of the set of tape pulleys 11. The wire 10 serves to transmit rotation to the other wire pulley 11.

A plurality of electrically controlled heads are arranged in spaced relation along the wire 10, preferably at the runs thereof between the pulleys or reels 11 to act upon or be influenced or energized by the wire. A polarizing means 16, including a polarizing head 17, is arranged at one point to polarize the wire passing said point to condition it for recording. Spaced therefrom at a successively related or positioned station is a recording head 18 which is associated with suitable recording means, and which serves to magnetize the wire 10. The recording means includes a microphone or transmitter 19 for converting the sounds to be recorded into electrical pulses. The recording means is here illustrated as a conventional microphone circuit, including a battery 20, switch 21 and transformer 22 for increasing the strength of the signal pulses.

At a third successive or sequential station is positioned a pick-up or reproducing head 23 which is energized by the magnetized wire 10 as it passes said head. Suitable reproducing means is associated with the pick-up head, the means here illustrated including an amplifier 24 and a loud speaker 25. The character of the means associated with the pick-up head 23 will depend upon the use to which the device is to be put, that shown being for use in conjunction with an instrument, such as an electric organ, to control the sound effect produced by said organ. Other uses, such as for radio broadcasting, for recording on disc records, or the like may employ alternative devices energizable by said pick-up head 23 and of types well understood in the art.

Between the pick-up head 23 and the polarizing head 17 is positioned an adjustable de-magnetizing means including wiping or de-magnetizing head 26. Head 26 may be connected in a circuit including battery 27 and rheostat 28.

The device described above is capable of operation to reproduce and amplify faithfully and truly the sound imposed upon the microphone or transmitter 19, when rheostat 28 is adjusted to cause wiping head 26 to completely de-magnetize wire 10 as it passes said head. However, it has the further advantage of being capable of adjustment to provide a selected echoing or reverberatory sound effect as a background for the principal signal or sound to be reproduced. Thus, if rheostat 28 is adjusted for predetermined partial de-magnetization of wire 10 as it passes head 26, the subsequent effect of the recording head 18 upon the partly de-magnetized wire is to impose thereon the new signal as an addition to the residue of the previous signal. Thus, as wire 10 leaves recording head 18 it is magnetized principally or predominantly as a recording of the primary signal, and to a small degree by residual magnetism of a preceding signal. The sound effect obtained when the reproducing means is energized by this wire is a reproduction of the primary signal and a reverberatory background noise not distinguishable as a signal, per se, but only as or similar to an echo. The background may be adjusted to be as pronounced or faint as desired by adjusting the rheostat 28. When used to record and reproduce music, the reverberatory effect of one instrument, as a pipe organ, can be obtained from recorded music, in which reverberation is not inherent, as from the recorded music from an electric organ.

Where it is desired to introduce a vibrato, means may be employed in conjunction with the device above described for vibrating or oscillating one of the heads 18 or 23 along the wire 10 parallel to one of the runs thereof, as illustrated diagrammatically by arrows 29 in Fig. 1. One embodiment of such means is shown in Fig. 2, it being understood that this embodiment is intended solely as an illustration and the same result may be accomplished by many other instrumentalities of different types. The head to be vibrated, here assumed to be head 23, is mounted on a carrier 30 of any suitable construction. Carrier 30 is fixedly mounted on the end of a rod 31 which is slidably supported by and longitudinally reciprocable in a guide 32. The other end of rod 31 is pivoted at 33 to one end of a connecting rod 34 whose opposite end is pivoted at 35 to a crank arm 36 mounted on the drive shaft 37 of a motor 38. Crank arm 36 may have a plurality of apertures 39 therein for connection of the connecting rod therewith at different positions along the length of the crank arm. Also, motor 38 is preferably of the variable speed type and has a speed regulator (not shown) associated therewith.

Upon the operation of the motor 38, the associated head is reciprocated or oscillated longitudinally of the wire, while maintaining a constant transverse relation to or spacing from the wire, thereby continuously altering the frequency of the signal picked up thereby. For example, if the signal recorded on the wire passing the pick-up station is the tone A below middle C on the piano, which has a normal frequency of 440 cycles per second, the effect of the vibration or oscillation of head 23 may be controlled to alternate and vary the frequency thereof as reproduced between predetermined limits above and below said frequency, for example between 435 and 445 cycles per second. In other words, when the head being reciprocated moves oppositely to the direction in which the wire 10 is moving the frequency is increased, and when said head moves in the same direction as the wire the frequency is reduced. By constructing and adjusting the vibrating means with particular regard to the conditions and requirements of its intended use, such as the speed of travel of wire 10, the effect produced by the vibration or oscillation can be correlated to the type of sound or signal, as of voice, musical instrument, etc., encountered in that use. The effects which can be produced and the sounds which can be simulated are numerous, but the principal function is to produce vibrato effects.

By virtue of the provision of separate controls, i. e., rheostat 28 and a control (not shown) for motor 38, the device may produce either reverberation or vibrato, or both together, at the will of the operator. Also, by adjustment of the pivot connection of the connecting rod 34 with the crank arm 36, the range of reciprocation of the head carrier 30 may be regulated as desired to provide a further control factor.

An alternative embodiment of the invention is illustrated in Figs. 3 and 4. A shaft 40 mounts a disc 41 having a non-magnetic and non-conducting annular rim 42, preferably of radially outwardly tapering cross section. A ring 43 of magnetizable wire or tape fits around rim 42, as in a shallow groove thereof, whereby the major cross-section of said wire or tape projects from said rim. An annular stationary frame 44 encircles the disc 41, being arranged in concentric and coplanar relation to said disc. Frame 44 may be provided with suitable supporting means, such as base members 45. At spaced circumferential points the annular frame 44 may mount brackets 46 which support, in operative relation to the exposed wire or tape, the heads 47 associated with the polarizing, recording, reproducing and de-magnetizing means previously described with reference to the embodiment shown in Fig. 1. The bracket 48 which mounts that one of the heads, as of the recording or reproducing means, which is to be reciprocated, may have a guided movement on frame 44, as on a tangent thereto, and may be spring pressed toward one end of its path of movement. A cam 49 mounted on a rotatable shaft 50 which is driven by any suitable driving means (not shown) may be positioned to engage and be pressed against by bracket 48, thereby providing simple means for reciprocating a selected head along wire 43. The cam 49 may be detachably mounted on shaft 50, for selective interchange with a plurality of other cams providing different strokes and periods of reciprocation of the reciprocable head carrier. Alternatively, a number of different cams may be mounted on the same shaft, and means may be provided to shift the assembly to bring a selected cam into operative relation to the carrier of the head which is to be reciprocated. The advantage of the cam type of construction resides in its simplicity and compactness. Also, the wire is fixed on its mounting, in this embodiment, so that mechanical stresses and fatigue factors are minimized.

The device is preferably mounted in a housing (not shown) as a unit, in both embodiments shown, so that compactness facilitates portability and also simplifies problems of space limitations, wall mounting and the like.

It will be noted that the device differs from recording means per se, inasmuch as the recording is merely incidental and a given magnetic effect is retained for an exceedingly short period of time only. This eliminates the need for long lengths of wire commonly required in recording devices of the magnetic wire or tape type and therefore permits the use of wire of heavier gauge and greater strength than space and winding limitations permit in a conventional magnetic wire type of recorder. It will be apparent that care must be exercised to insure that the wire in the device is properly shielded against extraneous magnetic and electrical effects thereon, in order to prevent interference with proper functioning of the device.

Although the device has been illustrated with one pick-up head or reproducing means, a plurality thereof may be used. Where more than one pick-up head or reproducing means is provided, they will preferably be selected for individual response to limited ranges of the frequency of the recorded sound. For example, one may be responsive to low frequencies, such as frequencies below 800 cycles per second, and another may be responsive to high frequencies, such as frequencies above 800 cycles per second. The individual pick-up heads may be arranged to oscillate in unison or at different speeds and strokes at the election of the operator or one may be stationary and the other reciprocable. Multiple pick-up heads must be positioned close together and the wire or tape must travel at high speed to avoid objectionable time lag effects. When properly arranged and correlated, the use of multiple pick-up heads will permit the production of novel and pleasing sound effects, by virtue of the breaking up of the tones thereby and the possibility of emphasizing certain tones.

Tremulent effects can also be produced by the device by reciprocating or oscillating one of the recording or pick-up heads transversely of the tape. For simplicity of construction, and assuming that one of the heads, such as the reproducing head or heads, is mounted for longitudinal reciprocation to produce vibrato as described above, the other head or heads of the recording and reproducing set may be mounted for transverse oscillation to produce tremolo. The means for producing such transverse oscillation may be similar to the means described for producing longitudinal oscillation, or may be of any other suitable type or construction.

An illustrative means for this purpose is illustrated in Fig. 5 wherein the recording head 61 is yieldingly mounted in the support 60 so that the tip 62 of its electrode is positioned in proper relation to the magnetizable wire or tape 10. A star wheel 63 is provided with a number of teeth or projections 64 and is mounted upon a rotating shaft 65 so positioned that the teeth 64 of the star wheel will engage the recording head 61 to urge the same transversely of the wire or tape 10. The shaft 65 may travel at such a speed and the number of teeth 64 may be so correlated with said speed that the desired frequency of oscillation of the recording head is secured.

The construction accommodates oscillation of the head lengthwise of the wire by mounting the support or bracket 60 for reciprocation upon the frame 44' to be spring-pressed toward one end of its path of movement and suitable means may be provided for oscillating said support or bracket 60, such as a cam 49', which is mounted upon a rotatable shaft 50', which cam is positioned to engage and be pressed against by the bracket 60 so as to oscillate the said bracket when the cam is rotated. The transverse oscillation must be of such amplitude and period, in relation to the electrical and magnetic values involved and to the speed of travel of the magnetic wire or tape, that the desired tremulent effect is produced. Thus the oscillations must not be so great as to move the head outside of the range of magnetic reaction thereof with the wire, but should be sufficient to produce distinguishable alternately increased and decreased amplitude or volume which characterizes tremolo.

While I prefer the application of the invention to apparatus of the magnetic wire type, it is not strictly limited thereto. Thus, by oscillating the pick-up head longitudinally of the sound track of any recording, such as a disc phonograph record or a motion picture film sound track, a vibrato effect may be produced.

I claim:

1. A device for producing sound effects comprising a magnetizable wire, mechanism for driving said wire, recording means including a head for influencing said wire, reproducing means including a head influenced by said wire, means for oscillating one head longitudinally of said wire, and means for oscillating the other head transversely of said wire within the field of magnetic influence between said head and wire.

2. A device for producing sound effects comprising a magnetizable wire, mechanism for driving said wire, recording means including a head for influencing said wire, reproducing means including a head influenced by said wire, means for oscillating one head longitudinally of said wire, means for oscillating the other head transversely of said wire within the field of magnetic influence between said head and wire, and means for selectively controlling each of said head-oscillating means.

his
ROY V. × GRAVEEL.
mark

Witness to mark:
MILTON A. JOHNSON.

REFERENCES CITED

The following references are of record in the file of this patent:

UNITED STATES PATENTS

| Number | Name | Date |
| --- | --- | --- |
| 1,325,574 | Nichols | Dec. 23, 1919 |
| 1,366,617 | Wier | Jan. 25, 1921 |
| 1,588,706 | Cothran | June 15, 1926 |
| 2,038,647 | Clansen | Apr. 28, 1936 |
| 2,105,318 | Goldsmith | Jan. 11, 1938 |
| 2,169,762 | Kaye | Aug. 15, 1939 |
| 2,213,246 | Heller | Sept. 3, 1940 |
| 2,251,300 | Star | Aug. 5, 1941 |
| 2,327,956 | Begun | Aug. 24, 1943 |
| 2,350,083 | Walker | May 30, 1944 |
| 2,373,560 | Hanert | Apr. 10, 1945 |

FOREIGN PATENTS

| Number | Country | Date |
| --- | --- | --- |
| 4,825 | Great Britain | Feb. 27, 1906 |